United States Patent
Tinkler et al.

(10) Patent No.: US 11,426,024 B2
(45) Date of Patent: Aug. 30, 2022

(54) BEVERAGE PREPARATION MACHINE ARRANGED TO SHARE CAPSULE IMAGE AND MACHINE OPERATION DATA

(71) Applicant: Keurig Green Mountain, Inc., Burlington, MA (US)

(72) Inventors: Ian Tinkler, Wakefield, MA (US); Jianming Huang, Andover, MA (US); Kevin William Hartley, Burlington, MA (US); Cameron McLeod, Newton, MA (US); Samuel Ross Rulli, Gloucester, MA (US); Nicholas George Ioannidis, Tewksbury, MA (US); James K. Lynch, Georgetown, MA (US); Brian David Rheaume, Tewksbury, MA (US); Jeffrey Sol Hadden, Arlington, MA (US); Philip Hadley, Middlebury, VT (US); Yvona Hlobilova, Shelburne, VT (US)

(73) Assignee: Keurig Green Mountain, Inc., Burlington, MA (US)

(*) Notice: Subject to any disclaimer, the term of this patent is extended or adjusted under 35 U.S.C. 154(b) by 295 days.

(21) Appl. No.: 16/791,756

(22) Filed: Feb. 14, 2020

(65) Prior Publication Data

US 2020/0178723 A1 Jun. 11, 2020

Related U.S. Application Data

(62) Division of application No. 15/009,445, filed on Jan. 28, 2016, now Pat. No. 10,595,668.

(51) Int. Cl.
*A47J 31/44* (2006.01)
*A47J 31/40* (2006.01)

(52) U.S. Cl.
CPC ......... *A47J 31/4492* (2013.01); *A47J 31/407* (2013.01); *A47J 31/44* (2013.01)

(58) Field of Classification Search
CPC ...... A47J 31/407; A47J 31/44; A47J 31/4492; H04N 1/00; G06K 9/00979
See application file for complete search history.

(56) References Cited

U.S. PATENT DOCUMENTS 5,072,660 A 12/1991 Helbling
6,101,485 A 8/2000 Fortenberry et al.
(Continued)

FOREIGN PATENT DOCUMENTS

CN 101087356 A 12/2007
CN 101661601 A 3/2010
(Continued)

OTHER PUBLICATIONS

Invitation to Pay Additional Fees for for International Application No. PCT/US2017/015250, dated Jun. 19, 2017.
(Continued)

*Primary Examiner* — Justin C Dodson
(74) *Attorney, Agent, or Firm* — Wolf, Greenfield & Sacks, P.C.

(57) ABSTRACT

An apparatus and method for sharing capsule image data and beverage preparation parameters, from one or more beverage preparation machines with a remote computer system via a network, such as the Internet, is disclosed. The remote computer system may process the capsule image data to determine characteristics of the capsule (e.g., a type of capsule, such as a brand, or beverage ingredients in the capsule), thereby relieving the beverage preparation from having to determine information about the capsule. The remote computer may track a user's consumption of capsules, may compare this value to the user's past capsule (Continued)

purchase history, and may determine if the user's supply of capsules is below a threshold value (e.g., below a week's worth of capsules).

11 Claims, 8 Drawing Sheets

(56) References Cited

U.S. PATENT DOCUMENTS

| | | | |
|---|---|---|---|
| 6,479,086 | B1 | 11/2002 | Knepler |
| 6,676,014 | B2 | 1/2004 | Catan |
| 6,798,997 | B1 | 9/2004 | Hayward et al. |
| 6,985,877 | B1 | 1/2006 | Hayward et al. |
| 7,013,092 | B2 | 3/2006 | Hayward et al. |
| 7,032,818 | B2 | 4/2006 | Thomas et al. |
| 7,216,951 | B2 | 5/2007 | Garrana et al. |
| 7,223,427 | B2 | 5/2007 | Knepler |
| 7,387,239 | B2 | 6/2008 | Thomas et al. |
| 7,475,026 | B2 | 1/2009 | Rock, Jr. et al. |
| 7,490,024 | B2 | 2/2009 | Marzaro et al. |
| 7,513,412 | B2 | 4/2009 | Benedetti et al. |
| 7,673,558 | B2 | 3/2010 | Panesar et al. |
| 8,264,318 | B2 | 9/2012 | Ebrom et al. |
| 8,281,621 | B2 | 10/2012 | Dunsbergen et al. |
| 8,397,543 | B2 | 3/2013 | Dunsbergen et al. |
| 8,400,638 | B2 | 3/2013 | Dunsbergen et al. |
| 8,627,526 | B2 | 1/2014 | Dunsbergen et al. |
| 8,775,263 | B2 | 7/2014 | Killoran, Jr. et al. |
| 8,800,084 | B2 | 8/2014 | Dunsbergen et al. |
| 9,035,785 | B2 | 5/2015 | Dunsbergen et al. |
| 9,119,505 | B2 | 9/2015 | Guard et al. |
| 9,138,096 | B2 | 9/2015 | Yoakim |
| 9,164,867 | B2 | 10/2015 | Ebrom et al. |
| 10,595,668 | B2 | 3/2020 | Tinkler et al. |
| 2003/0191588 | A1 | 10/2003 | Arellano |
| 2009/0219140 | A1 | 9/2009 | Guard et al. |
| 2010/0086653 | A1 | 4/2010 | Fedele |
| 2012/0075663 | A1 | 3/2012 | Lum et al. |
| 2012/0152125 | A1 | 6/2012 | Yoakim et al. |
| 2012/0173357 | A1 | 7/2012 | Yoakim |
| 2012/0240780 | A1 | 9/2012 | Delbreil et al. |
| 2012/0245732 | A1 | 9/2012 | Yoakim |
| 2012/0253993 | A1 | 10/2012 | Yoakim et al. |
| 2012/0295234 | A1 | 11/2012 | Rognon |
| 2013/0014648 | A1* | 1/2013 | Rognon ............ A47J 31/3623 426/87 |
| 2013/0087050 | A1 | 4/2013 | Studor et al. |
| 2013/0173811 | A1 | 7/2013 | Ha et al. |
| 2013/0235197 | A1 | 9/2013 | Ebrom et al. |
| 2013/0236609 | A1 | 9/2013 | Magniet et al. |
| 2014/0025487 | A1 | 1/2014 | Killoran |
| 2014/0263780 | A1 | 9/2014 | Day, Jr. |
| 2015/0037473 | A1* | 2/2015 | Epars .................... G06Q 10/06 99/285 |
| 2015/0047509 | A1 | 2/2015 | Trombetta |
| 2015/0105880 | A1 | 4/2015 | Slupik et al. |
| 2015/0132449 | A1 | 5/2015 | Ye et al. |
| 2015/0234372 | A1 | 8/2015 | Slupik et al. |
| 2015/0238044 | A1 | 8/2015 | Halliday et al. |
| 2015/0257586 | A1 | 9/2015 | DiNucci |
| 2016/0301558 | A1 | 10/2016 | Twiss |
| 2017/0215632 | A1 | 8/2017 | Tinkler et al. |

FOREIGN PATENT DOCUMENTS

| | | |
|---|---|---|
| CN | 102640193 A | 8/2012 |
| CN | 103188974 A | 7/2013 |
| CN | 103919462 A | 7/2014 |
| CN | 104580290 A | 4/2015 |
| CN | 104939678 A | 9/2015 |
| CN | 105147110 A | 12/2015 |
| CN | 105263376 A | 1/2016 |
| EP | 2 085 000 A1 | 8/2009 |
| EP | 2 345 352 A1 | 7/2011 |
| JP | 2013-512699 A | 4/2013 |
| JP | 2013-517028 A | 5/2013 |
| JP | 2015-180293 A | 10/2015 |
| WO | WO 02/28241 A1 | 4/2002 |
| WO | WO 2011/067191 A1 | 6/2011 |
| WO | WO 2014/005939 A1 | 1/2014 |
| WO | WO 2014/195351 A1 | 12/2014 |
| WO | WO 2015/055849 A1 | 4/2015 |
| WO | WO 2015/058531 A1 | 4/2015 |

OTHER PUBLICATIONS

International Search Report and Written Opinion for International Application No. PCT/US2017/015250, dated Aug. 16, 2017.

* cited by examiner

BEVERAGE PREPARATION MACHINE ARRANGED TO SHARE CAPSULE IMAGE AND MACHINE OPERATION DATA

CROSS-REFERENCE TO RELATED APPLICATIONS

This application is a divisional of and claims the benefit under 35 U.S.C. § 120 to U.S. patent application Ser. No. 15/009,445, entitled "BEVERAGE PREPARATION MACHINE ARRANGED TO SHARE CAPSULE IMAGE AND MACHINE OPERATION DATA" and filed on Jan. 28, 2016, the entire contents of which are incorporated herein by reference.

FIELD

The disclosed embodiments are generally directed to beverage preparation machines, and more particularly to beverage preparation machines arranged to share capsule image and machine operation data.

BACKGROUND

Beverage preparation machines, such as beverage brewers, are widely used to make beverages using capsules that contain ingredients, such as coffee grounds, tea leaves, and/or other soluble and/or insoluble materials. Such beverage preparation machines can often be used with a capsule containing a wide variety of different ingredients so as to make different beverages, such as coffee, tea, hot chocolate, flavored still drinks, flavored carbonated drinks, and so on.

SUMMARY OF INVENTION

Aspects of the invention relate to sharing capsule image data and beverage preparation parameters from one or more beverage preparation machines with a remote computer system via a network, such as the Internet. The remote computer system may process the capsule image data to determine characteristics of the capsule (e.g., a type of capsule, such as a brand, or beverage ingredients in the capsule), thereby relieving the beverage preparation machine from having to determine information about the capsule. That is, the beverage preparation machine may simply capture an image of a portion of the capsule bearing an indicia (e.g., a portion of the lid of the capsule with the indicia), and transmit the capsule image data to the remote computer. Using the capsule image data, the remote computer system may determine characteristics related to the capsule (e.g., by decoding the indicia contained in the image data). The capsule image data may be sent with beverage preparation parameters, such as the day of the week and the time of day, and the size, type and/or strength of the beverage prepared.

According to one embodiment, a system for collecting information from a beverage preparation machine is disclosed. The beverage preparation machine includes a capsule holder arranged to hold a capsule containing ingredients and use the capsule ingredients to form a beverage, a precursor liquid supply including components to supply a precursor liquid used to form the beverage with the capsule ingredients, an imaging device arranged to capture an image of a portion of the capsule in the capsule holder having a machine readable code, and control circuitry arranged to control the imaging device to capture the image of the portion of the capsule in the capsule holder, and arranged to control components of the precursor liquid supply to form the beverage using the capsule in the capsule holder, the control circuitry including a beverage preparation machine data module arranged to send, for each beverage preparation operation, undecoded image data representing the image of the portion of the capsule having the machine readable code to a remote computer system via a network. In some embodiments, the beverage preparation machine data module is arranged to send, for each beverage preparation operation, information regarding beverage preparation parameters used to make the beverage during the beverage preparation operation to the remote server via the network.

According to another embodiment, a method of forming a beverage is disclosed. The method includes receiving a capsule in a capsule holder of a beverage preparation machine, imaging a portion of the capsule in the capsule holder bearing a machine readable code, forming a beverage by the beverage preparation machine as part of a beverage preparation operation using ingredients in the capsule, the beverage preparation operation having a set of associated beverage preparation parameters, and sending, from the beverage preparation machine for each beverage preparation operation, undecoded image data representing an image of the portion of the capsule having the machine readable code to a remote computer system via a network. In some embodiments, the method also includes sending, from the beverage preparation machine for each beverage preparation operation, information regarding beverage preparation parameters used to make the beverage during the beverage preparation operation to the remote computer via the network.

Aspects of the invention also relate to determining a user's need for capsule replenishment based on beverage preparation machine usage and past purchase history. That is, the remote computer may track a user's consumption of capsules, may compare this value to the user's past capsule purchase history, and may determine if the user's supply of capsules is below a threshold value (e.g., below a week's worth of capsules). Consumption may be determine based on capsule image data that the beverage preparation machine sends to the remote computer. For example, the remote computer may tally the number of capsule images that have been taken by the beverage preparation machine to determine the number of capsules that have been used. The remote computer also may process the capsule image data to determine not only the number of capsules that have been used, but also the type of capsules. In other examples, the remote computer need not use or receive capsule image data in order to track consumption. That is, the remote computer may track capsule consumption without having any knowledge of the identity of the capsule (e.g., the brand or beverage ingredients). For example, the remote computer may use beverage preparation parameters to determine the number of beverage preparation events at the beverage preparation machine, and may extrapolate the number of capsules that have been used from that value.

In these examples, the remote computer may notify the user when the user's supply of capsules is below a threshold value. For example, the remote computer may send the user a notification to purchase additional capsules or may send the user a notification that capsules will be automatically shipped to the user (e.g., if the user already has an automatic subscription to purchase the capsules).

According to one embodiment, a system for assessing usage of a beverage preparation machine is disclosed. The beverage preparation machine includes a capsule holder arranged to hold a capsule containing ingredients and use the capsule ingredients to form a beverage, the capsule holder arranged to operate with multiple different types of capsules, a precursor liquid supply including components to supply a precursor liquid used to form the beverage with the capsule ingredients, and control circuitry arranged to control components of the precursor liquid supply to form a beverage using a capsule in the capsule holder, the control circuitry including a beverage preparation machine data module arranged to combine and send, to a remote computer system via a network and for each beverage preparation operation, a communication including information regarding beverage preparation parameters used to make a beverage during the beverage preparation operation. The remote computer system includes a communications interface arranged to receive communications regarding beverage preparation operations including beverage preparation parameters, the communications interface not receiving information from the beverage preparation machine regarding identification information for capsules used by the beverage preparation machine, a memory arranged to store the beverage preparation parameters for each beverage preparation operation and to store information regarding historical capsule purchases associated with the beverage preparation machine; and an order processing module arranged to direct the sending an offer to purchase or shipment of a specific type of capsule to a user associated with the beverage preparation machine based on the historical capsule purchase information and the beverage preparation parameter information for the beverage preparation machine.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. For example, aspects of the invention are described with reference to a specific capsule arrangement, but aspects of the invention are not limited to the capsule arrangements described herein. Thus, aspects of the invention are not intended to be construed narrowly in view of the illustrative embodiments. In addition, it should be understood that aspects of the invention may be used alone or in any suitable combination with other aspects of the invention.

Figure 1:
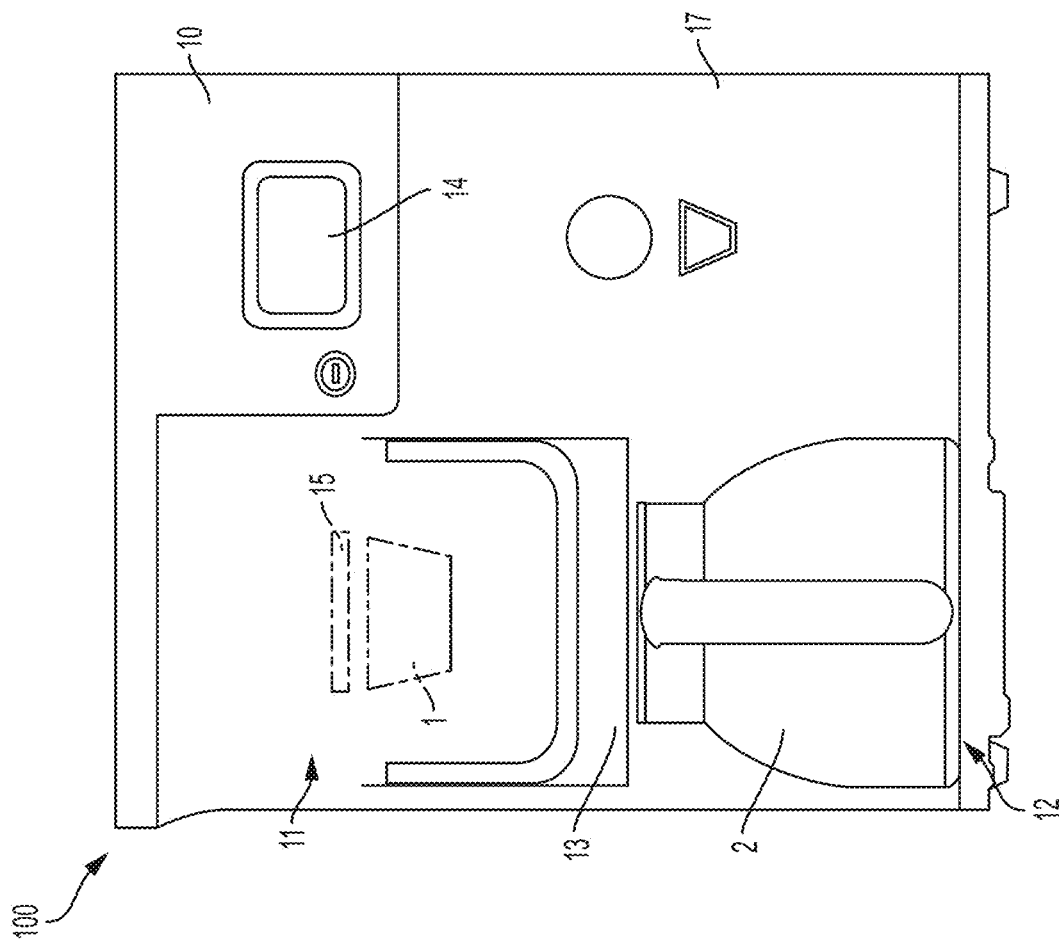
FIG. 1 is a front view of a beverage forming apparatus with an imaging device located in a beverage forming station in an illustrative embodiment.

FIG. 1 shows a front view of a beverage preparation machine, beverage forming apparatus 100, in an illustrative embodiment that incorporates aspects of the invention. For purposes herein, the beverage forming apparatus 100 may be used to form any suitable beverage, such as tea, coffee, other infusion-type beverages, carbonated beverages, beverages formed from a liquid or powdered concentrate, soups, juices or other beverages made from dried materials, or others. As will be appreciated, the beverage forming apparatus may produce hot and/or cold beverages. In the illustrative embodiment of FIG. 1, the apparatus 100 is arranged to form coffee or tea beverages (e.g., as a beverage brewer). As is known in the art, a beverage capsule, such as beverage cartridge 1, may be provided to the apparatus 100 and used to form a beverage that is deposited into a carafe 2. (As used herein, a carafe is any suitable container arranged to receive a dispensed beverage.) The cartridge 1 may be manually or automatically placed in a beverage forming station 11 of a beverage forming machine 10. For example, the beverage forming station 11 may include a cartridge receiver that is exposed to receive the cartridge 1 when the user operates a handle or other actuator. With the cartridge 1 placed in the cartridge receiver, the actuator may be operated to at least partially enclose the cartridge 1, e.g., so that water or other precursor liquid can be introduced into the cartridge 1 to form a beverage. For example, with the cartridge 1 held in the beverage forming station 11, the cartridge 1 may be pierced to form inlet and outlet openings through which water or other precursor liquid enters the cartridge 1 and beverage exits the cartridge 1, respectively. U.S. Pat. No. 8,361,527 describes a cartridge and a system for introducing liquid into the cartridge that may be used in an embodiment of this invention, and is hereby incorporated by reference in its entirety.

Figure 2:
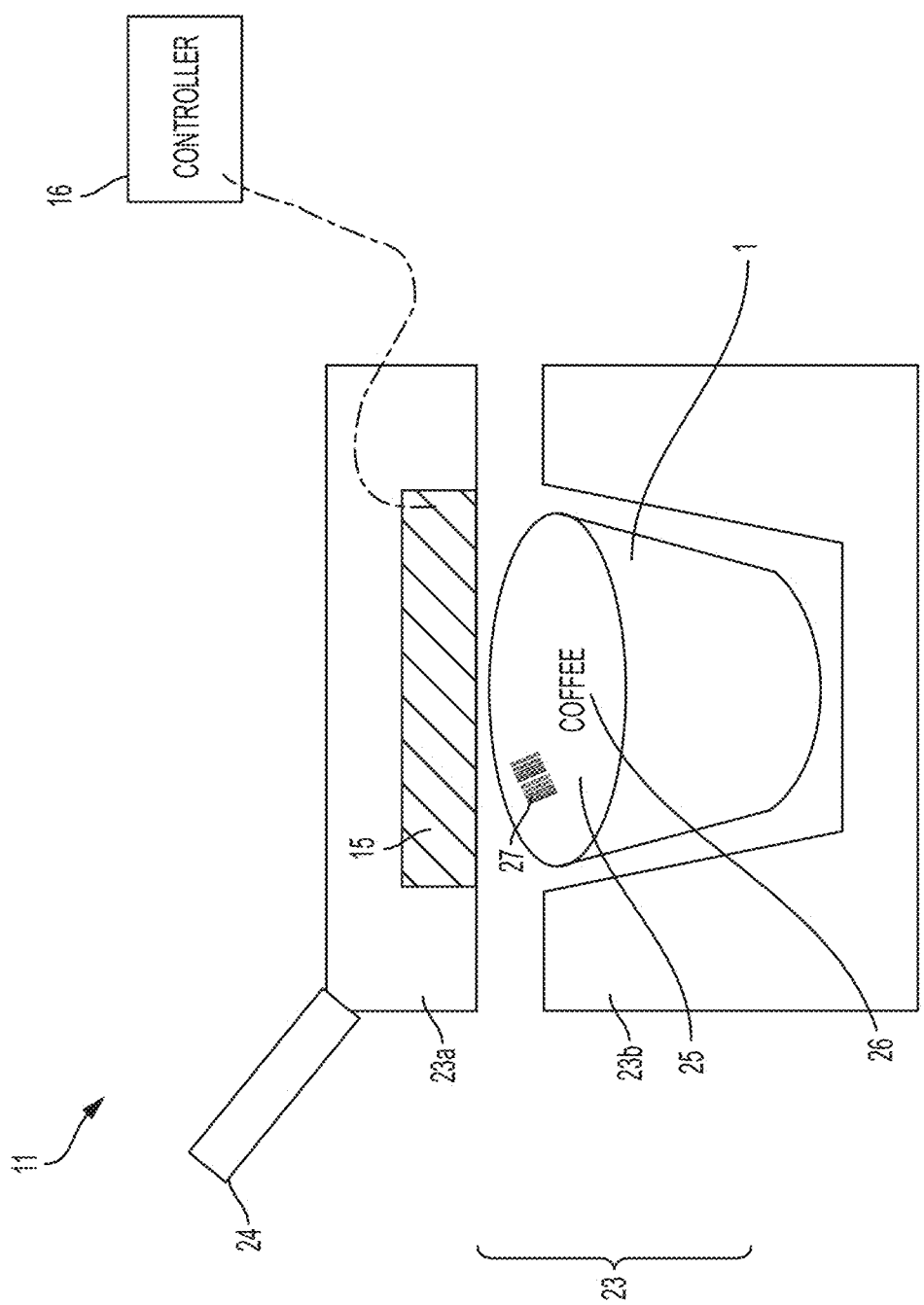
FIG. 2 is an enlarged view of a beverage forming station in an illustrative embodiment.

According to one aspect, as shown in FIG. 1, the beverage forming station 11 includes an imaging device 15 arranged to capture an image of a portion of the cartridge 1 bearing an indicia. For purposes herein, indicia on the cartridge may include a barcode (e.g., a 2D or 3D barcode), RFID, inductive, magnetic, optical (e.g., text, graphics, color), physical or other indicia arranged to indicate a characteristic of the capsule (e.g., the beverage ingredients in the capsule). In some embodiments, as shown in FIG. 2, the imaging device 15 is located in the cartridge receiver 23 of the beverage forming station 11, adjacent to the cartridge 1. In one embodiment, the imaging device 15 is placed on a top portion 23*a* of the cartridge receiver, above the cartridge 1, to captures an image of a portion of a top of the cartridge 1. For example, the imaging device 15 may capture an image of a portion of a lid 25 of the cartridge.

As shown in FIG. 2, the cartridge 1 may include more than one type of indicia that is captured by the imaging device 15. For example, the imaging device may capture an image of text 26 printed on the lid 25 (e.g., optical indicia). The imaging device 15 also may capture an image of a barcode 27 printed on the lid 25. As will be appreciated, the imaging device 15 may be arranged to capture one or both of the indicia (e.g., one or both of the text 26 and barcode 27) on the lid 25. In some embodiments, the imaging device captures an image of the entire lid 25 of the cartridge. As will be appreciated, not all aspects of the invention require the imaging device 15 to capture an image of the cartridge 1 (e.g., the remote computer may track consumption without using capsule image data).

Although the imaging device 15 is shown above the cartridge 1 in FIG. 2, in other embodiments, the imaging device 15 may be placed in other suitable areas of the cartridge receiver 23 to capture other images of the cartridge 1. For example, the imaging device 15 may be placed below the cartridge (e.g., on a bottom portion 23b of the cartridge receiver) to capture an image of a bottom of the cartridge. In another example, the imaging device 15 may be positioned adjacent a side of the cartridge 1 (e.g., on the bottom portion 23b of the cartridge receiver) to capture an image of a portion of the side of the cartridge.

As will be appreciated, although only one imaging device is shown in FIG. 2, in some embodiments, the beverage forming station 11 may have one or more imaging devices. That is, the beverage forming station 11 may be configured to capture multiple images of the same cartridge. For example, the beverage forming station may capture images of the top and side of the cartridge in one embodiment. In another example, the beverage forming station may capture images of the top and bottom of the cartridge. The beverage forming station also may capture images of the top, bottom and side of the cartridge.

In some embodiments, the imaging device 15 includes a camera, such as a digital camera. As will be appreciated, other suitable imaging devices also may be used to capture an image of the cartridge.

Figure 3:
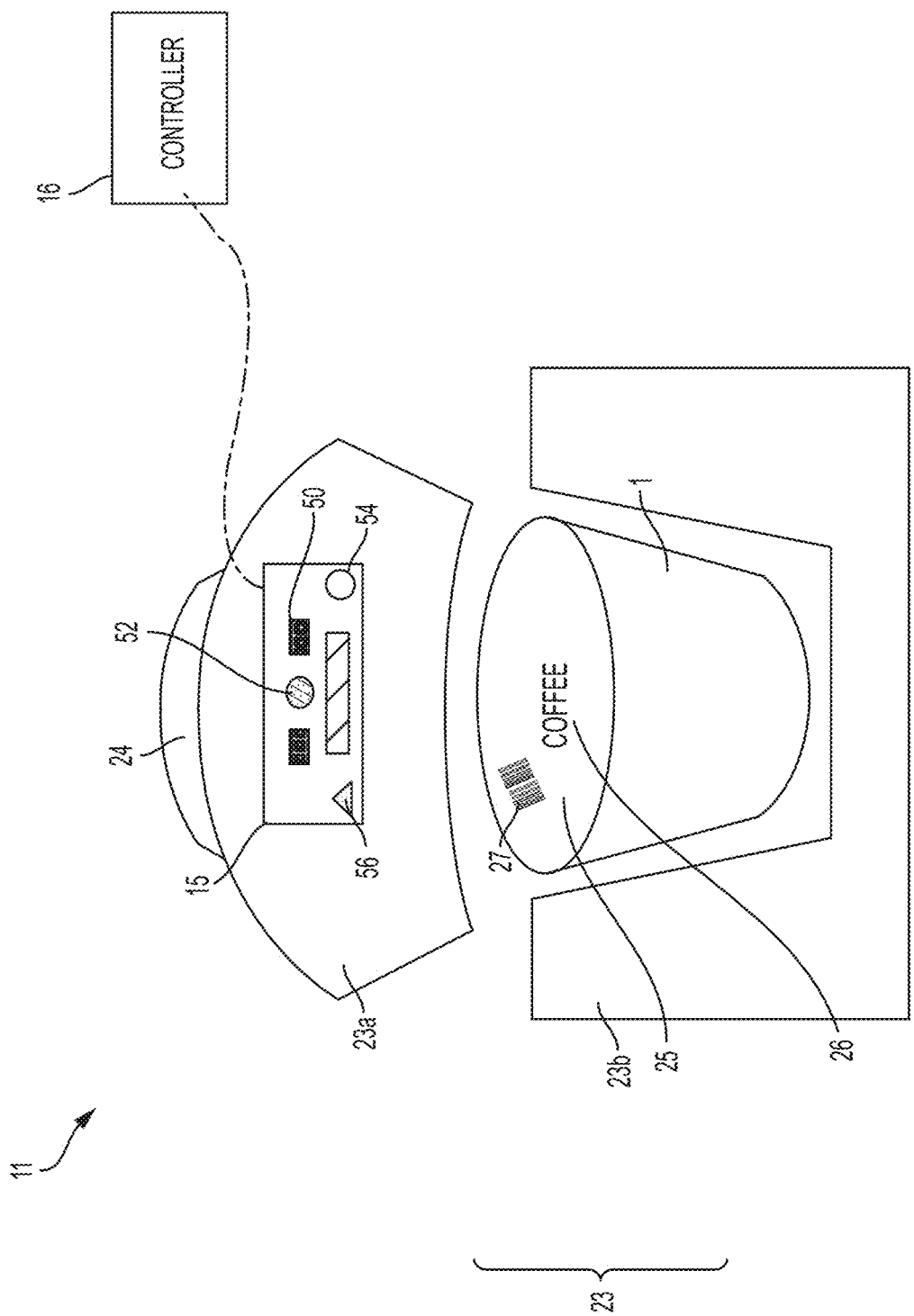
FIG. 3 is an enlarged view of a beverage forming station in another illustrative embodiment.
Figure 4:
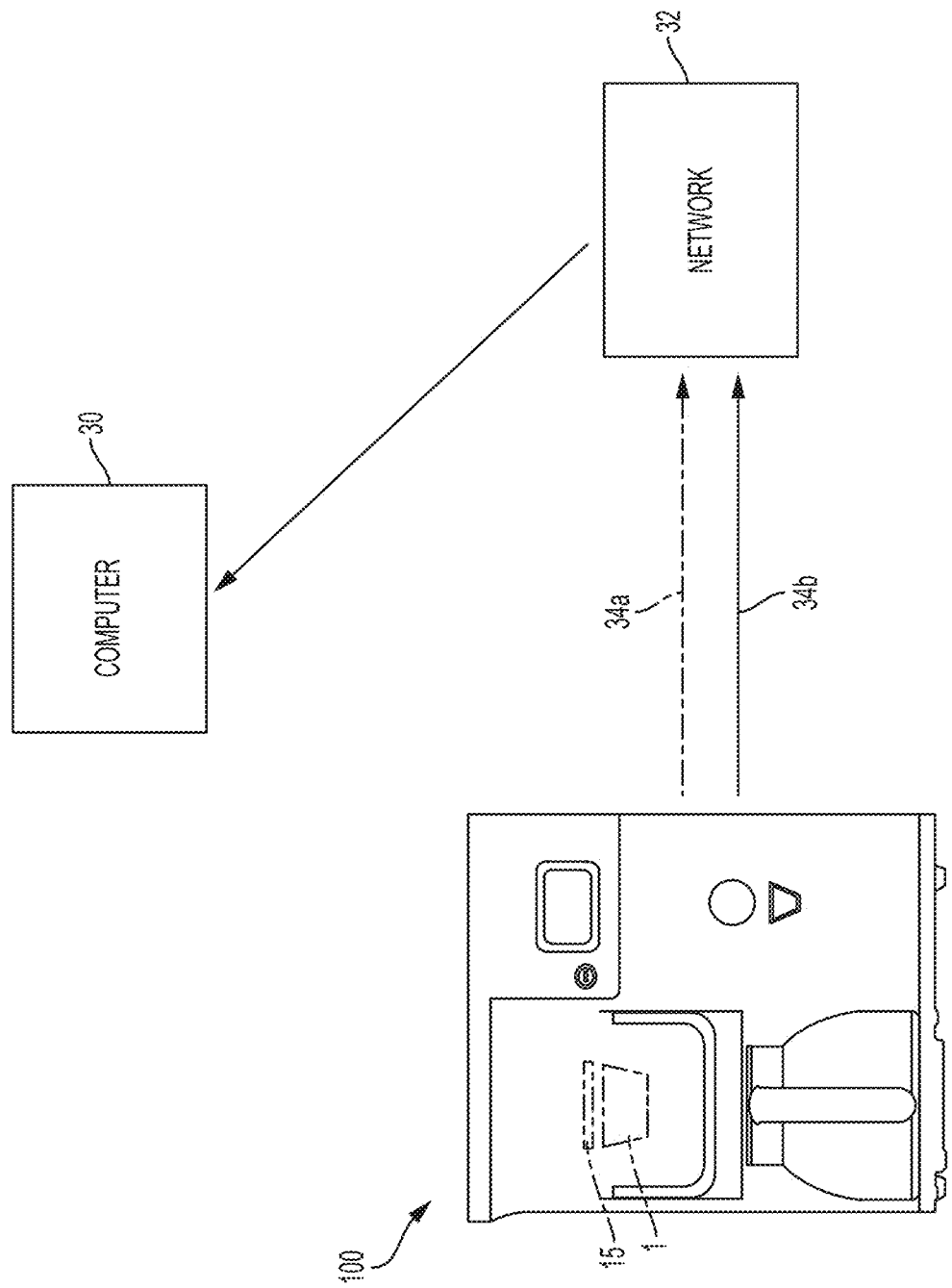
FIG. 4 is a schematic diagram of a beverage forming apparatus connected to a remote computer via a network in an illustrative embodiment.

As shown in FIGS. 2-4, the imaging device 15 is operatively coupled to a controller 16. In some embodiments, the controller 16 activates the imaging device 15 to capture an image of at least a portion of the cartridge when the cartridge is in the cartridge receiver 23. In some embodiments, the imaging device 15 captures an image of the cartridge as an actuator 24 is moved to at least partially cover the cartridge. That is, the image may be captured when the top portion 23a of the cartridge receiver is being moved over the top of the cartridge 1. In such an embodiment, the imaging device 15 may be located on the top portion 23a of the cartridge receiver, although the imaging device 15 also may be located on the bottom portion 23b of the cartridge receiver. In other embodiments, the imaging device may capture an image during beverage formation (e.g., after the cartridge receiver 23 has been closed and the top of the cartridge has been pierced via an inlet needle to inject the precursor liquid into the cartridge). The imaging device also may capture the image when the beverage formation has completed (e.g., after a brew cycle), or when the actuator is moved to uncover the cartridge.

In some embodiments, the imaging device 15 includes lighting elements to enhance the quality and consistency of the image that is captured. For example, as shown in FIG. 3, the imaging device 15 may include two lighting elements 50, which may be mounted (e.g., permanently mounted) on either side of an image sensor 52. Although two lighting elements are shown in this figure, one or more lighting elements may be used in other embodiments. As will be appreciated, although the lighting elements are located on the top portion 23a of the cartridge receiver, in other embodiments, the lighting elements may be located or another suitable portion of the cartridge receiver (e.g., on the side of the cartridge receiver). In some embodiments, the lighting elements include ambient light sensors, LEDs or another suitable lighting element.

In some embodiments, the lighting elements 50 may be set to an optimum angle that will minimize the reflection from the cartridge lid 25 and will balance the quality of the image created using the imaging device's auto-exposure (e.g., a camera's auto-exposure). As will be appreciated, although the auto-exposure of the imaging device is used in these embodiments, in other embodiments, a separate light sensor may be used. In some embodiments, the lighting elements 50 may be enabled (e.g., will shine a light onto the cartridge) whenever the cartridge receiver 23 is in an open position.

In some embodiments, the controller may activate the imaging device 15 to capture the image according to a trigger mechanism. In some embodiments, the trigger mechanism will detect the closing of the cartridge receiver and will instruct the imaging device 15 to capture an image of at least a portion of the lid 25 when the image sensor 52 reaches a set angle with respect to the lid 25. For example, the imaging device 15 may be arranged to capture the image when the image sensor is as close to perpendicular to the cartridge lid 25 as possible. In such an arrangement, the cartridge receiver need not be entirely closed. As will be appreciated, in some embodiments, the lighting elements 50 may be configured to turn off when the cartridge receiver is fully closed.

In some embodiments, as shown in FIG. 3, the trigger mechanism may be used to initiate an image capture when the cartridge receiver is being closed and at least a portion of the cartridge receiver (e.g., a top portion of the cartridge receiver) has reached an optimum angle for capturing the image. As will be appreciated, in some embodiments, there may be a range of optimum angles (e.g., an optimum range) for capturing the image. For example, the range of optimum angles may be between about 10° and about 90°. In such embodiments, the range of optimum angles may be stored on the apparatus (e.g., in the memory).

In some embodiments, the beverage forming apparatus may include a first sensor 54, such as a hall effect sensor, that senses the position of the cartridge receiver. For example, the first sensor may be a mechanical switch that is activated when the cartridge receiver is at one of the optimum angles.

In some embodiments, the trigger mechanism may be armed, enabling the imaging device to capture the image, when the first sensor 54 senses that the cartridge receiver has passed through the optimum range in an upward direction. In such embodiments, the trigger mechanism may initiate an image capture (e.g., of at least a portion of the cartridge lid 25) when the first sensor 54 thereafter senses that the cartridge receiver has moved through the optimum range in a downward direction.

In some embodiments, the imaging device includes a second sensor 56, such as an accelerometer, that may serve as a backup if the trigger mechanism is not armed. For example, if a user shallowly opens the cartridge receiver such that at least a portion of the cartridge receiver does not pass into the optimum range (and is not sensed by the first sensor), the trigger mechanism may not be armed. As will be appreciated, in such embodiments, if the trigger mechanism is not first armed, the trigger mechanism may not thereafter initiate an image capture. In some embodiments, the trigger mechanism may be armed when the second sensor 56 detects a change in the direction of the cartridge receiver. As with prior embodiments, once armed, the trigger mechanism may initiate an image capture when the cartridge receiver subsequently passes through the optimal range in the downward direction.

According to another aspect, the beverage forming apparatus is configured to transfer capsule image data to a remote computer. For example, as shown in FIG. 4, the apparatus 100 may transfer data to a remote computer 30 via a network 32. In some embodiments, the remote computer includes a communications interface arranged to receive the capsule image data (e.g., undecoded capsule image data). The remote computer also may include memory arranged to store the data (e.g., the decoded indicia).

In some embodiments, the controller 16 is arranged to transmit the capsule image data to the remote computer 30 during or after beverage formation cycle has completed (e.g., during or after a brew cycle). As will be appreciated, the controller 16 may include a data module arranged to send the capsule image data to the remote computer 30. The controller 16 also may be configured to store the capsule image data in a memory of the beverage forming apparatus 100 after completion of the beverage formation, and to transmit the capsule image data from the memory to the remote computer 30 at a later time. For example, if the beverage forming apparatus does not have network connectivity (e.g., the Ethernet cable has been unplugged or the wireless connection has been interrupted), the controller 16 may instruct the apparatus' memory to store the capsule image data until the apparatus has reestablished network connectivity, at which point the capsule image data will be transmitted to the remote computer 30. As will be appreciated, in some embodiments, the beverage forming apparatus may not be configured to store the capsule image data in the memory, in which case the capsule image data may be discarded by the beverage forming apparatus (e.g., if there is no network connectivity).

According to another aspect, the beverage forming apparatus is configured to capture and send beverage preparation parameters to the remote computer 30 (e.g., via the controller 16). In some embodiments, the controller is arranged to send both capsule image data and beverage preparation parameters to the remote computer 30. As will be appreciated, in other embodiments, the controller 16 may be arranged to send only capsule image data or only beverage preparation parameters to the remote computer 30.

In some embodiments, the beverage preparation parameters recorded by the beverage forming apparatus include the day of the week, the time of day, the size (e.g., volume) of beverage prepared, the temperature of the water, the strength of beverage formed (e.g., strong, medium, weak), the type of beverage formed, and/or other apparatus settings (e.g., power settings, whether air was introduced into the precursor liquid during beverage formation, a carbonation level of the beverage, a location of the beverage preparation machine during preparation of the beverage or an identity of a user associated with preparation of the beverage. As with the capsule image data, in some embodiments, the controller 16 is arranged to send the beverage preparation parameters to the remote computer upon completion of beverage formation cycle (e.g., after the brew cycle). In other embodiments, the beverage preparation parameters may be stored in the apparatus' memory and transmitted to the remote computer at a later time. In still another embodiment, the controller 16 may be configured to discard the beverage preparation parameters if the apparatus is not connected to the network.

According to still another aspect, the beverage forming apparatus 100 is arranged to transmit undecoded capsule image data to the remote computer (e.g., a remote server) that will decode the indicia stored in the capsule image data and store the decoded indicia (e.g., store the type of cartridge or the beverage materials in the cartridge). That is, in some embodiments the beverage forming apparatus does not itself decode the capsule indicia. Rather, the apparatus simply captures an image of a portion of the cartridge and sends the raw capsule image data to the remote computer for processing. As shown in FIG. 4 the apparatus 100 may transmit the undecoded capsule image data to the remote computer via a network 32 (e.g., the Internet).

Figure 7:
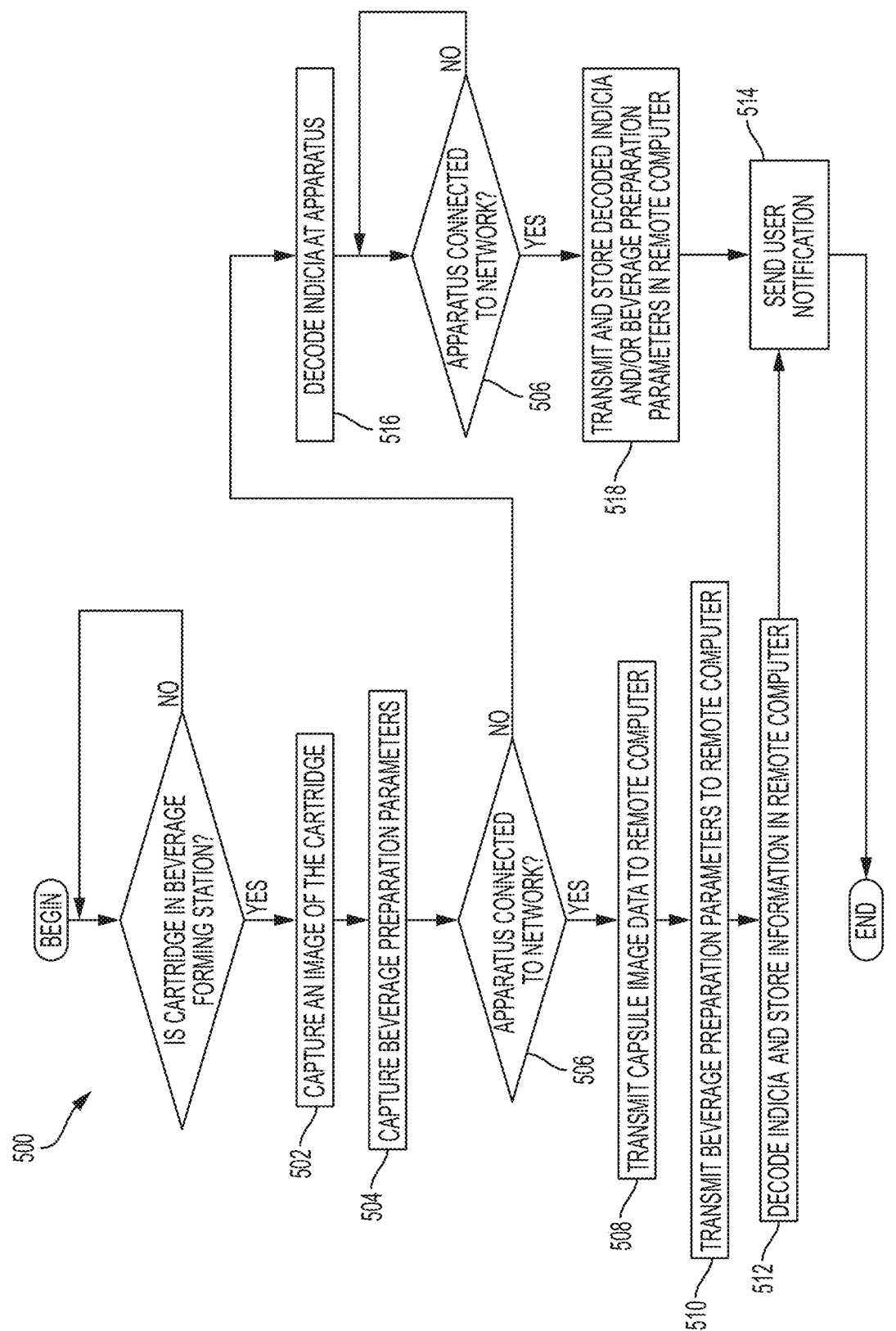
FIG. 7 is a flow chart of another illustrative image capturing sequence.

In other embodiments, the apparatus 100 may be configured to decode the capsule indicia. For example, as shown in FIG. 7, in instances in which the beverage forming apparatus is not connected to the network, the beverage forming apparatus may be arranged to decode the capsule indicia. As will be appreciated, in such embodiments, the imaging device may include an image decoder (e.g., a barcode reader). In such embodiments, once network connectivity has been reestablished, the decoded indicia may be transmitted to the remote computer.

Turning back to FIG. 4, the remote computer also may be connected to the network. As is shown, the beverage forming apparatus may have one-directional communication with the remote computer (via the network 32). That is, the apparatus may communicate with the remote computer but may not receive communications therefrom. In such an instance, the remote server may be arranged to send communications directly to a user (e.g., to a user's telephone or e-mail.). The beverage forming apparatus also may be arranged to have bidirectional communication with the remote computer (e.g., sending communications to and receiving communications from the remote computer). For example, the remote computer may send the user a message that is displayed on a user interface on the apparatus. In other embodiments, the remote server may send decoded indicia (e.g., a beverage preparation parameter) back to the apparatus 100, which may then use the parameter to prepare the beverage.

In some embodiments, the beverage forming apparatus 100 is connected to the network 32 via a wireless connection 34a, while in other embodiments, the apparatus 100 may be connected via a wired connection 34b (e.g., via an Ethernet cable). In such embodiments, the apparatus may access the network 32 via the user's modem or wireless router.

In some embodiments, the beverage forming apparatus may have a built-in wireless card that allows the apparatus to connect wirelessly to the network 32. The beverage forming apparatus 100 also may be connected to wireless adapter (e.g., a dongle) that allows the apparatus to establish a wireless connection with the network 32.

In some embodiments, the user connects the beverage forming apparatus to the network (e.g., so that the apparatus can transmit capsule image data to the remote computer). In one example, the user connects the apparatus to the network 32 by plugging an Ethernet cable into a port on the apparatus. In another example, the user connects the beverage forming apparatus to the network 32 by enabling wireless connectivity. That is, the user may use a peripheral device (e.g., a smartphone) to enable the apparatus' wireless connection to the network 32. In such an embodiment, the user may use a smartphone application with instructions on how to configure the wireless connection and/or with software to load onto the beverage forming apparatus. In other embodiments, the user enables wireless connectivity by simply pressing a button on the beverage forming apparatus.

According to some embodiments, the user may opt-in to allow the beverage forming apparatus to transmit information (e.g., the capsule image data and/or beverage preparation parameters) to the remote computer via the network. In such embodiments, the user may opt in by downloading an application on his peripheral device (e.g., a smartphone application) and/or by filling out form with his name, phone number, email address, when he purchased the apparatus, etc.

Figure 5:
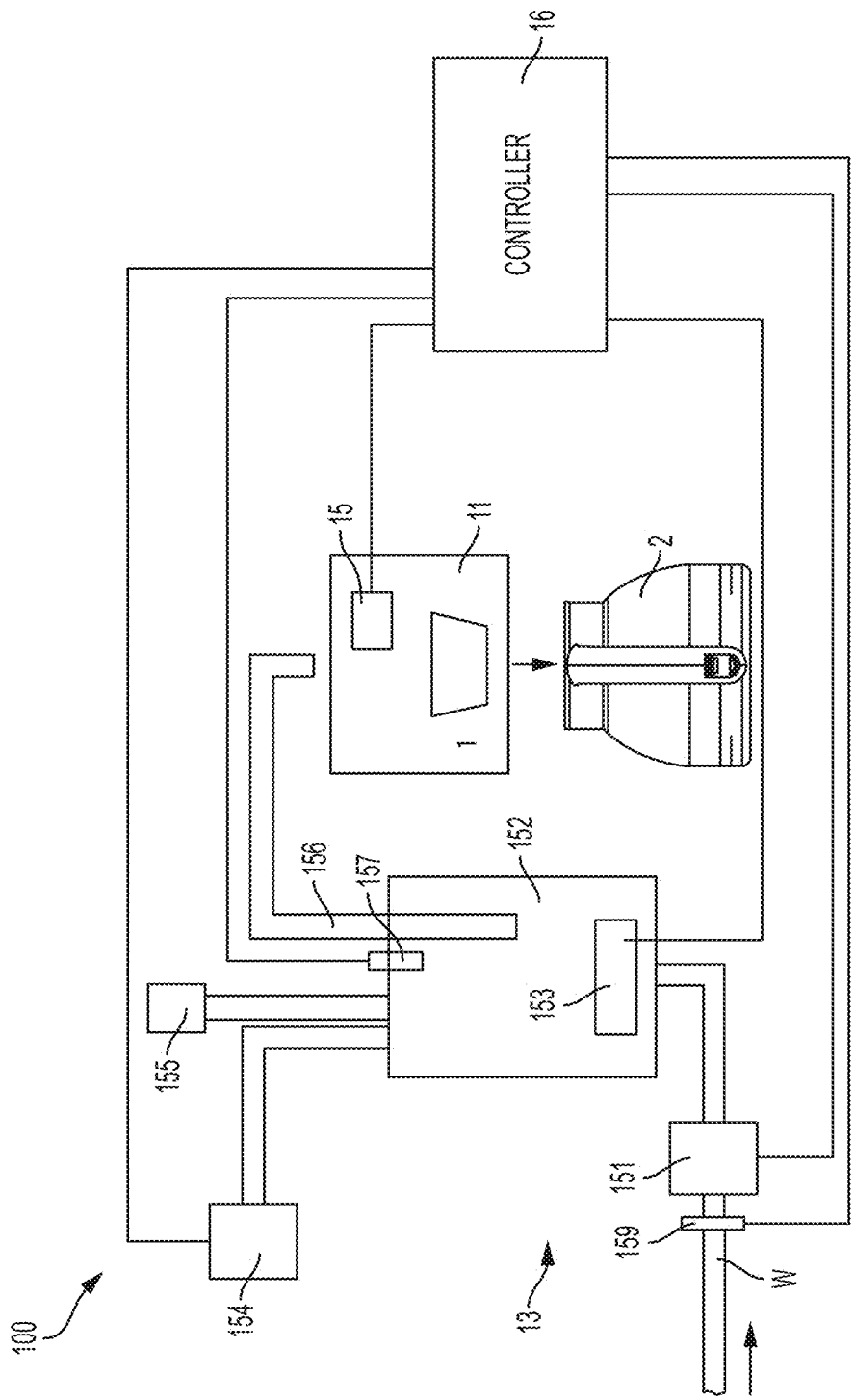
FIG. 5 is a schematic diagram of components of a beverage forming apparatus in an illustrative embodiment.

As shown in FIG. 5, the beverage forming apparatus includes a liquid supply 13, which supplies liquid to the tank 152. In some embodiments, the liquid supply includes a sensor 159 to monitor the liquid being fed from the water source W to the tank 152 (e.g., via valve 151). In some embodiments, the sensor 159 is a pressure sensor. Other optional features, such as a vent 155 which can be opened or closed to vent the tank 152, a check valve or other flow controller that can prevent backflow in the conduit between the source W and the tank 152, or other features may be included. In this embodiment, the vent 155 is not controlled by the controller 16, but remains always open with an orifice of suitable size to allow venting for filling of the tank 152, and pressure buildup in the tank 152 to allow liquid delivery. Also, control of a volume of liquid provided to the tank 152 may be performed in other ways, such as opening the valve 151 for a defined period of time, running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

In some embodiments, the liquid conditioner includes a tank for holding a liquid to be conditioned and the liquid supply includes a level sensor to detect a level of liquid in the tank. In some embodiments, the liquid conditioner includes a heater configured to heat the liquid, and the apparatus further includes an air pump arranged to pressurize the tank to force liquid in the tank to flow into the beverage forming station. As illustrated in FIG. 5, liquid in the tank 152 may be heated by way of a heating element 153 whose operation is controlled by the controller 16 using input from a temperature sensor or other suitable input. Of course, heating of the liquid is not necessary, and instead (or additionally) the apparatus 100 may include a chiller to cool the liquid, a carbonator to carbonate the liquid, or other system to otherwise condition the liquid. In this embodiment, liquid in the tank 152 may be dispensed via a conduit 156 to the beverage forming station 11. The liquid may be discharged from the tank 152 by an air pump 154 operating to force air into the tank 152 to pressurize the tank and force liquid to flow in the conduit 156 to the beverage forming station 11. Again, liquid may be caused to flow from the tank 152 to the beverage forming station 11 in other ways, such as by opening the valve to force additional unheated liquid into the tank 152, thereby displacing water out of the tank 152 and into the conduit 156. A flow sensor or other suitable device may be used to determine the amount of liquid delivered to the tank 152, and thus the amount of liquid delivered to the beverage forming station 11. Alternately, a pump may be used to force additional liquid into the tank 152, or to pump liquid from the tank 152 to the forming station 11. For example, a specified volume of liquid may be delivered to the forming station 152 by operating a pump to deliver the specified volume of liquid from the liquid source W to the tank 152, e.g., a diaphragm pump may deliver 5 ml for each pump stroke, and thus 100 ml of liquid may be delivered to the tank 152 by operating the pump through 20 pump cycles. Liquid may be introduced to the beverage forming station 11 at any suitable pressure, e.g., 1-2 psi, 30-50 psi, or higher. Although in this embodiment the conduit 156 is shown as extending into the tank 152, the conduit 156 could be arranged in other suitable ways. For example, the outlet of the heater tank 152 to the conduit 156 could be arranged at an extreme top of the tank 152, or in other ways. The conduit 156 may include a check valve or other flow controller, e.g., to help prevent backflow in the tank conduit 156 from the forming station 11.

Figure 6:
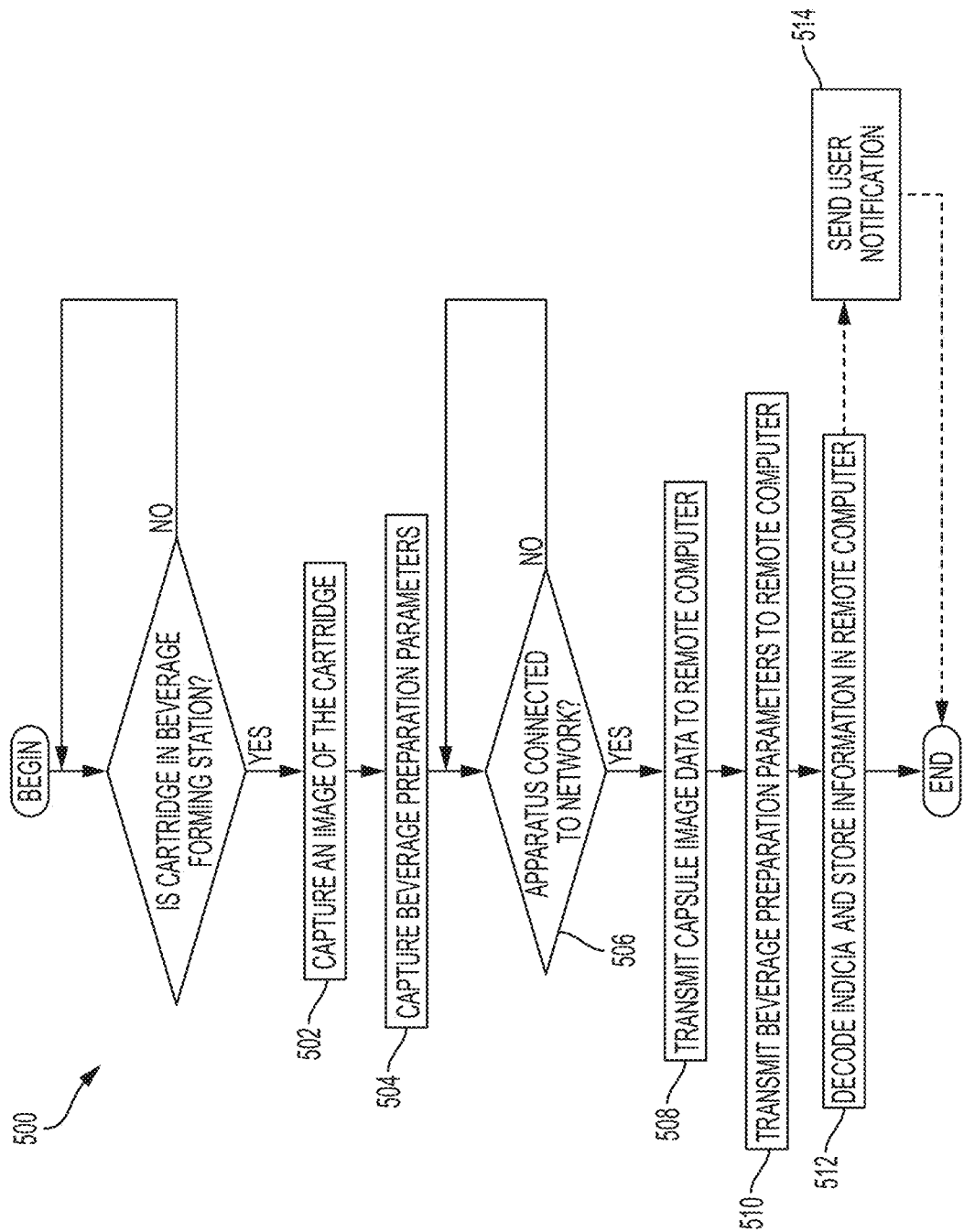
FIG. 6 is a flow chart of an illustrative image capturing sequence.

As shown in FIG. 6, according to another aspect, a method of forming a beverage 500 is disclosed. In some embodiments, the method includes receiving a cartridge in a cartridge holder of a beverage forming station and capturing an image of a portion of the cartridge via an imaging device 502. Capturing the image of the portion of the cartridge may include capturing the image of the portion of the cartridge bearing indicia (e.g., a lid of the cartridge having text and/or a barcode). In other embodiments, capturing the image of a portion of the cartridge may include capturing an image of the entire lid of the cartridge. Capturing the image of the portion of the cartridge also may include capturing a portion of at least one of the side and bottom of the cartridge.

In some embodiments, the method further includes capturing beverage preparation parameters 504 (e.g., date, time, beverage size, beverage preparation temperature, etc.).

If the beverage forming machine is connected to the network 506, the method may include transmitting the capsule image data (e.g., without any prior decoding) to a remote computer (e.g., a remote server) 508. The method also may include sending the beverage preparation parameters to the remote computer via the beverage forming machine 510.

In some embodiments, if the beverage forming machine is not connected to the network, the method may include storing the capsule image data and/or the beverage preparation parameters in the apparatus' memory and transmitting the capsule image data and/or beverage preparation parameters when the apparatus has again established network connectivity. As will be appreciated, the method also may include discarding the capsule image data and/or the beverage preparation parameters if the apparatus is not connected to the network.

In other embodiments, as shown in FIG. 7, if the beverage forming apparatus is not connected to the network 506, the method may include decoding the capsule indicia at the beverage forming apparatus 516 (e.g., via an image decoder, such as a barcode reader, in the imaging device). As will be appreciated, the method may include storing the decoded indicia in the apparatus' memory until network connectivity has been reestablished. As with other embodiments, the apparatus may be arranged to transmit the decoded indicia and/or beverage preparation parameters to the remote computer 518 once the apparatus is again connected to the network 506.

Turning back to FIG. 6, in some embodiments, once the remote computer receives the capsule image data (e.g., the undecoded data), the computer process the image and decodes the indicia in the capsule image data via an image decoder (e.g., OCR software) to determine characteristics of the cartridge 512. For example, the indicia may include the type of beverage prepared by the apparatus and/or the brand of the cartridge. The decoded information is saved on the remote computer (e.g., in a database under the user's profile).

As will be appreciated, in some embodiments, the remote computer may be configured to send a user notification 514 based upon the decoded information (e.g., that there is a sale on a particular type of cartridge). In some embodiments the user notification includes an email sent to the user's email address (e.g., with a link to purchase the sale items). The user notification also may include a message displayed on the user interface of the apparatus.

According to another aspect, the remote computer is configured to track the number of capsules consumed by the user (e.g., the number of cartridge used and/or the types of cartridges used). In some embodiments, the remote computer may track consumption by tracking the number of capsule image data that the beverage forming apparatus sends to the computer. That is, the remote computer may tally the number of capsules that were imaged by the apparatus. In another embodiment, the remote computer may track consumption by tallying the information extracted from the decoded indicia. That is, the remote computer may count the number of each type of capsule used by the user. In still another embodiment, the remote computer tracks consumption without first identifying the capsule (e.g., without first imaging the cartridge to know characteristic of the cartridge). In such embodiments, the number of cartridges used by the user may be calculated using the beverage preparation parameters. For example, the number of cartridges used may be extrapolated from the number of beverage preparation cycles run by the beverage formation apparatus.

According to another embodiment, the remote computer is configured to determining a user's need for capsule replenishment based on the user's consumption and on past purchase history. In some embodiments, the remote computer determines when a user is in need of capsule replenishment by determining when the user's current supply of cartridges falls below a threshold amount (e.g., less than a week's worth of cartridges). In some embodiments, the remote computer determines the user's current cartridge supply (e.g., a remaining number of unused cartridges) by comparing the number of cartridges purchased by the consumer (e.g., purchased from the beverage forming apparatus manufacturer, such as via an e-commerce website) and the number of cartridges consumed by the user. The remote computer also may determine whether the number of remaining cartridges has fallen below the threshold amount. The remote computer may run an algorithm to make such a calculation.

Figure 8:
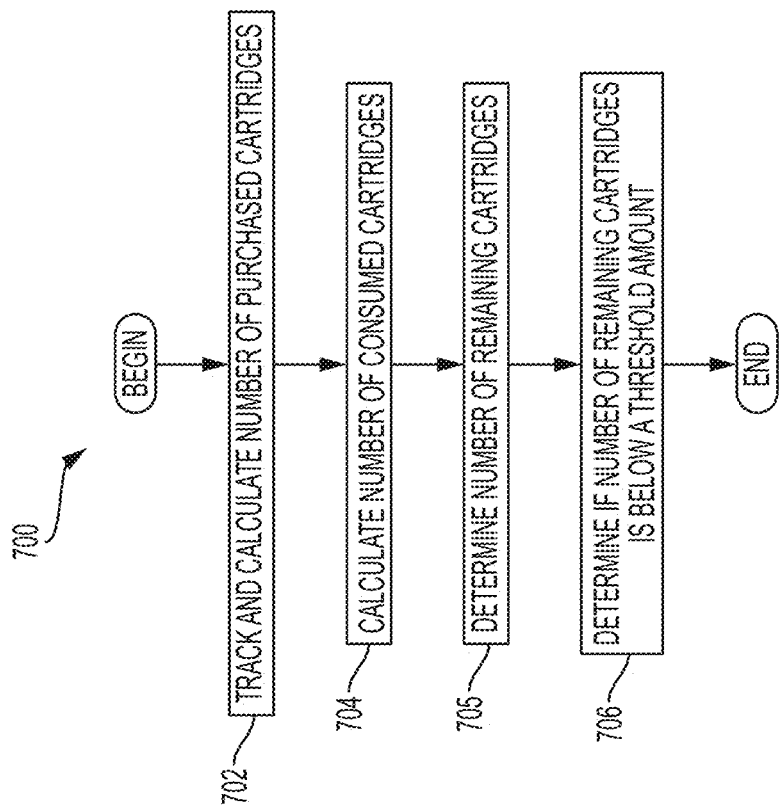
FIG. 8 is a flow chart of an illustrative algorithm used to calculate a user's supply of unused cartridges.

As shown in FIG. 8, in one embodiment, the algorithm 700 may include the following steps. First, track and calculate the number of cartridges (e.g., the number of a specific variety of cartridges) that a user has purchased on an e-commerce website 702, such as the website of the beverage forming apparatus manufacturer. For example, the user's orders may be tracked, with the number of purchased cartridges determined by multiplying the number of cartridges per box (e.g., 12 cartridges per box) times the number of boxes purchased. As will be appreciated, this number may be added to an existing number of purchased cartridges if the user already has a cartridge supply. Next, determine the number of cartridges (e.g., the number of a specific variety of cartridges) that have been consumed to form a beverage with the apparatus 704. As previously described, the number of cartridges consumed by the user may be calculated by using capsule image data to track the number cartridges used by the brewer and/or by tallying beverage preparation parameters (e.g., may be determined with or without knowledge of the identity of the cartridge used). Next, subtract the number of consumed cartridges from the number of purchased cartridges to determine the number of remaining cartridges (e.g., the user's supply) 705. Finally, determine if the number of remaining cartridges (e.g., remaining unused cartridges purchased by the user at the e-commerce website) is below a threshold amount 706.

As will be appreciated, the threshold amount may be a number of cartridges needed to prepare a week's worth of beverages using the beverage forming apparatus. In some embodiments, the remote computer is configured to notify the user when the user is in need of a capsule replenishment. That is, when the user's cartridge supply (i.e., the number of purchased cartridges less the number of used cartridges) falls below a threshold number, the remote computer may send the user a notification (e.g., a communication). In some embodiments, the user notification includes an email to the user with an offer to purchase additional cartridges. The user notification also may include an email to the user that a shipment of cartridges will be made after a certain period of time (e.g., in a week), if the user has already signed up for automatic cartridge deliveries.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of forming a beverage, comprising:
receiving a capsule in a capsule holder of a beverage preparation machine;
imaging a portion of the capsule in the capsule holder bearing a machine readable code;
forming a beverage by the beverage preparation machine as part of a beverage preparation operation using ingredients in the capsule, the beverage preparation operation having a set of associated beverage preparation parameters; and
sending, from the beverage preparation machine for each beverage preparation operation, undecoded image data representing an image of the portion of the capsule having the machine readable code to a remote computer system via a computer data network, the undecoded image data being sent by control circuitry of the beverage preparation machine configured to send a computer data signal including the undecoded image data to the remote computer system via the computer data network.

2. The method of claim 1, further comprising:
sending, from the beverage preparation machine for each beverage preparation operation, information regarding beverage preparation parameters used to make the beverage during the beverage preparation operation to the remote computer system via the network.

3. The method of claim 2, further comprising:
receiving at communications interface of the remote computer system the undecoded image data and information regarding the beverage preparation parameters;
decoding the undecoded image data at an image decoder of the remote computer system to generate indicia corresponding to the machine readable code; and
storing the indicia with the information regarding beverage preparation parameter in a memory for each beverage preparation operation.

4. The method of claim 3, wherein the indicia represents information regarding a variety of the capsule ingredients contained in the capsule.

5. The method of claim 2, wherein the information regarding the beverage preparation parameters includes a time of day the beverage was prepared, a volume of the beverage, a temperature of precursor liquid used to form the beverage, whether air was introduced into the precursor liquid during beverage formation, a strength setting used to form the beverage, a carbonation level of the beverage, a location of the beverage preparation machine during preparation of the beverage, or an identity of a user associated with preparation of the beverage.

6. The method of claim 5, wherein the information regarding the beverage preparation parameters include at least three of a time of day the beverage was prepared, a volume of the beverage, a temperature of precursor liquid used to form the beverage, whether air was introduced into the precursor liquid during beverage formation, a strength setting used to form the beverage, a carbonation level of the beverage, a location of the beverage preparation machine during preparation of the beverage, or an identity of a user associated with preparation of the beverage.

7. The method of claim 1, wherein the machine readable code includes a barcode and the undecoded image data includes a data representing a visible image of the barcode.

8. The method of claim 1, wherein the undecoded image data is in JPEG, TIFF or raw data format.

9. The method of claim 1, wherein the undecoded image data represents an image of a portion of a lid of the capsule.

10. The method of claim 1, wherein the undecoded image data represents an image of any one of a plurality of different types of machine readable codes.

11. The method of claim 1, wherein the beverage preparation machine is incapable of decoding any machine readable code imaged by the imaging device.

* * * * *